2,854,345

MANUFACTURE OF FILAMENTS, FILMS, OR THE LIKE FROM NATURAL PROTEINACEOUS MATERIAL

Clifford J. McDowell, Tenafly, N. J., assignor to Corn Products Refining Company, New York, N. Y., a corporation of New Jersey No Drawing. Application May 2, 1956
Serial No. 582,070

4 Claims. (Cl. 106—153)

This invention relates to the manufacture of filaments, such as continuous threads, films, strips or bands from a natural proteinaceous material. It is particularly concerned with the preparation of dispersions of corn gluten which are capable of being spun to produce useful continuous filaments.

The manufacture of fibers from vegetable proteins, such as soya, peanut, and zein, is quite well known; however, it is not known to produce a continuous filament from a natural proteinaceous material, such as corn gluten. It has always been the general belief that an essentially 100 percent protein material (dry basis) was required to obtain a fiber in which the molecules were highly oriented for maximum strength. Consequently, it was quite surprising that a raw material, such as corn gluten, could be spun into a continuous filament, particularly into one having such useful and desirable properties. Unlike most other protein filaments, those from corn gluten will withstand being submerged in boiling water without cementing or sticking together. Also, at elevated temperatures (above 70° C.) in water and at a pH of about 5 to 6, increased elongation and toughening without filament rupture can be obtained from corn gluten fibers.

Inasmuch as the cost of producing continuous filaments from a raw material like corn gluten is comparatively low, the industrial applications for such fibers are quite numerous, particularly for decorative and protective applications where a definite filament length is required. Protein fibers are noted for their ability to readily accept organic dyes. Thus, such dyed filaments are added to light colored paper, moulded plastics, solvent coatings, etc., for decoration, and in many cases to add tear strength to papers and coatings.

These corn gluten fibers may also be used to support mineral fillers, such as ground asbestos, calcium carbonate, etc., which are used in the manufacture of brake linings, gaskets, insulation, wall board, plaster board, sheet rock, etc. Also, the inertness of these fibers under alkaline conditions prevents destruction or loss of strength from occurring during the drying or curing of sheet (plaster board, sheet rock, etc.).

A multitude of other uses may be cited for which there is a need for an inexpensive fiber; however, the above instances should be sufficient to illustrate the many applications of the fibers produced herein.

The principal object of this invention is to produce a continuous filament from corn gluten. A further object is to provide a method for preparing dispersions from corn gluten having a protein content of about 50 to 75 percent, dry basis, which dispersions can be spun into continuous filaments. Another object is to provide a method for treating corn gluten so that dispersions can be prepared therefrom which are capable of being spun to produce useful continuous filaments. A still further object is to provide a method for preparing dispersions from spray-dried corn gluten, which dispersions can be spun into continuous filaments. Other objects will appear hereinafter.

In order to prepare dispersions from corn gluten which could be spun into continuous filaments, applicant discovered that it was first necessary to pretreat the gluten. This he accomplished by slurrying a spray-dried gluten in hot water (temperature not exceeding about 60° C.). Next the pH of this slurry was increased from about 3.5 to 4.5 to about 6.8 to 7.2. While the slurry was constantly agitated, its temperature was maintained at about 55 to 60° C. for approximately one hour. The heated slurry was then cooled and washed with water as by decantation. The washed slurry of pretreated gluten was next dispersed in an aqueous alkaline solution. The dispersion thus produced having a pH of about 10.5 to 11.5 was filtered and deaerated to obtain a translucent solution. This solution was then spun into a coagulating bath to precipitate filaments, which were next stretched, cured in a bath containing formaldehyde, and finally baked to form useful continuous filaments.

Applicant was quite surprised that by such a simple pretreatment of the gluten he was able to accomplish his desired result. Particularly since all his attempts prior to the discovery of the above pretreatment had resulted in dispersions which were thixotropic and which lost their original viscosity through alkaline degradation. Such dispersions are entirely unsuitable for spinning into fibers. Furthermore, spin solutions prepared therefrom do not retain their fluidity or original solution characteristics as do the translucent solutions produced in applicant's process.

As this invention is primarily concerned with the preparation of corn gluten dispersions for spinning, the method that is to be followed during the spinning, stretching, curing, and baking operations is not critical and, therefore, any of the known methods may be employed.

The preferred method for carrying out this invention is set forth below:

One hundred and fifteen parts by weight of spray-dried corn gluten having a protein content of 70 percent, dry basis, was slurried in 400 parts of hot water (55–60° C.). Caustic or soda ash was added to increase the pH from about 4.0 to about 7.0 and mixing was continued for 50 to 60 minutes while the temperature was held at 55 to 60° C. At the end of this period the heating was discontinued and 400 parts of cold water was added. The mixing was then stopped, the slurry was allowed to settle for 30 minutes, and 400 parts of cloudy liquid was decanted. The water addition, mixing, settling, and decanting were repeated except that 430 parts of cloudy liquid was removed to allow for the addition of 10 percent caustic. In the two washes about 15 parts of the original product was lost. The amount of total solids is important in order to produce translucent solutions having suitable viscosities for spinning and for yielding fibers having optimum properties. Generally, the optimum viscosities for spinning solutions vary between 20 and 200 poises. The washed slurry was then ready for dispersing which involved adding 25 parts of 10 percent sodium hydroxide to increase the pH to about 11 and heating to 60° C. to complete the dispersion.

After being thoroughly mixed, the dispersion was next filtered and deaerated, and a translucent solution having the desired properties for spinning was obtained. A centrifugal pump, equipped with a by-pass to control the rate of feed, supplied the spinerettes with this translucent solution, which was precipitated into filaments in an acidic coagulating bath. This bath may contain from 0.5 to 15 percent, e. g. 10 percent, of sulfuric acid and at least 10 percent, e. g. 20 percent, by weight of a water-soluble inorganic salt, e. g. sodium sulfate. If desired, from 0.1 to 10 percent, e. g. 3 percent, by weight of formaldehyde may be added, the exact amount depending on whether or not partial stretching of the fibers is desired at this time. The temperature of this bath may range from 20 to 80° C., e. g. 45° C. Fresh coagulating solution was fed into this bath behind the spinerettes and followed the flow of the precipitated filaments; this solution was then exhausted at the far end of the tank. A reel, located at the far end of the spinning bath, smoothly pulled the precipitated fibers (tow) away from the spinerettes as soon as the continuous filaments were formed. The tow coming from the reel was directed into a pre-cure bath. This bath should contain at least 1 percent by weight of formaldehyde. It may also contain at least 1 percent by weight of a water-soluble neutral inorganic salt, and at least another 1 percent by weight of a water-soluble acid-reacting salt. The temperature may range from 25 to 46° C. A preferred precure bath contained 10 percent formaldehyde, 1 percent ammonium sulfate and 5 percent sodium sulfate and the fibers were cured therein for 15 minutes at 27° C. After a specified pre-cure period, governed by time, temperature, and concentration of formaldehyde in the precure bath, the tow was fed into the stretching unit. This unit was driven at 15 R. P. M. and was capable of elongating the tow by 300 percent. The bath in this unit contained water at 60° C. However, this bath may contain a water-soluble neutral or acid-reacting salt of a mineral acid having a pH of not more than about 7. The tow leaving the stretching unit was maintained under constant tension to retain the given stretch while it was being fed to the stretch setting unit. This unit was capable, at speeds of 15 R. P. M., of holding the tow under tension for 30 minutes. During this time the tow was subjected to a salt-formaldehyde-acid solution in order to cure and set the original stretch of the filaments. This first post-cure treatment may be carried on at room temperature. The formaldehyde content in the solution should be at least 1 percent. Preferred concentrations for this solution are: 20 percent sodium chloride, 1.1 percent sodium acetate, and 1.9 percent formaldehyde. The drums rotating in this first post-cure solution were so mounted that continuous operation was possible; the tow being fed in one end and side of the bath was recovered at the opposite end and side. The curing was completed in a second bath containing formaldehyde at elevated temperatures, e. g. 60° C. If desired, this second postcure bath may also contain ketene, sodium nitrite solution, or acetic anhydride. Such a cure gives the filaments high resistance to hot aqueous systems, such as the hot dilute acid baths encountered in dyeing. The tow was washed to remove any salt therefrom, baked at temperatures between about 60 to 90° C. to finish the cure and to release excess or unbound formaldehyde, rewashed after baking, and then redried and conditioned at temperatures below 100° C.

As many apparently widely different embodiments of this invention may be made without departing from the scope thereof, it is to be understood that applicant does not limit himself to the specific embodiments set forth above, except as defined in the appended claims.

I claim:
1. Process for the preparation of dispersions of corn gluten suitable for spinning which comprises heating an aqueous slurry of spray-dried corn gluten at a temperature of 55 to 60° C. for approximately one hour, said slurry having a pH of about 6.8 to 7.2; cooling and washing the thus heated slurry with water; decanting the supernatant liquid after said slurry has settled; then dispersing the washed slurry of pretreated gluten in an aqueous alkaline solution to form a dispersion having a pH of about 10.5 to 11.5.

2. Process for the production of continuous filaments from a natural proteinaceous material which comprises heating an aqueous slurry of spray-dried corn gluten at a temperature of 55 to 60° C. for approximately one hour, said slurry having a pH of about 6.8 to 7.2; cooling and washing the thus heated slurry with water; decanting the supernatant liquid after said slurry has settled; then dispersing the washed slurry of pretreated gluten in an aqueous alkaline solution to form a dispersion having a pH of about 10.5 to 11.5; filtering and deaerating said dispersion to obtain a translucent solution which is spun into filaments; and finally stretching, curing and baking said filaments.

3. Process according to claim 1, wherein said spray-dried corn gluten has a protein content of about 50 to 75 percent, dry basis.

4. Process according to claim 2, wherein said filaments are cured in a bath containing formaldehyde.

References Cited in the file of this patent

UNITED STATES PATENTS

| | | |
|---|---|---|
| 2,040,033 | Sturken et al. | May 5, 1936 |
| 2,134,764 | Leuck et al. | Nov. 1, 1938 |
| 2,338,919 | Ferretti | Jan. 11, 1944 |
| 2,340,909 | Traill et al. | Feb. 8, 1944 |
| 2,342,994 | Atwood | Feb. 29, 1944 |
| 2,389,292 | Bjorksten | Nov. 20, 1945 |
| 2,429,214 | Biehn | Oct. 21, 1947 |
| 2,552,079 | Yelland et al. | May 8, 1951 |